(12) United States Patent
Beezhold

(10) Patent No.: US 11,691,710 B2
(45) Date of Patent: Jul. 4, 2023

(54) DOUBLE TRANSLATING PLUG-TYPE PASSENGER ENTRY DOOR

(71) Applicant: The Boeing Company, Chicago, IL (US)

(72) Inventor: Benjamin Lee Beezhold, Chicago, IL (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 16/842,735

(22) Filed: Apr. 7, 2020

(65) Prior Publication Data

US 2021/0310290 A1     Oct. 7, 2021

(51) Int. Cl.
*B64C 1/14*     (2006.01)
*E05D 5/06*     (2006.01)

(52) U.S. Cl.
CPC ........ *B64C 1/143* (2013.01); *E05D 2005/067* (2013.01)

(58) Field of Classification Search
CPC ......... B64C 1/143; B64C 1/1423; E05D 5/06; E05D 5/062; E05D 3/12; E05D 3/122; E05D 3/125; E05D 3/127; E05D 3/14; E05D 3/145; E05D 3/147; E05B 51/02
See application file for complete search history.

(56) References Cited

U.S. PATENT DOCUMENTS 2,564,988 A * 8/1951 Muller .................. B64C 1/1407
244/129.5
2,763,900 A * 9/1956 McAfee ................ B64C 1/1407
49/248
3,085,297 A    4/1963 Linderfelt
4,199,120 A    4/1980 Bergman et al.
4,854,010 A * 8/1989 Maraghe ............... B64C 1/1407
49/248

(Continued)

FOREIGN PATENT DOCUMENTS

DE           258591   *  7/1988
WO   WO 2007/107861     9/2007

OTHER PUBLICATIONS

Extended European Search Report prepared by the European Patent Office in application No. EP 21 16 6173.1 dated Aug. 27, 2021.

*Primary Examiner* — Joshua J Michener
*Assistant Examiner* — Ka Chun Leung
(74) *Attorney, Agent, or Firm* — McDonnell Boehnen Hulbert & Berghoff LLP

(57) ABSTRACT

The present disclosure provides an aircraft door system including an aircraft door configured to translate from a closed position to an open position. The aircraft door system further includes a plurality of door pressure stops positioned along a length of the aircraft door and a handle coupled to the aircraft door. A rotation of the handle causes a first translation of the aircraft door in an inward direction and a forward direction. The aircraft door system further includes a hinge system coupled to the aircraft door. An outward force applied to the aircraft door causes a second translation of the aircraft door in an outward direction and a forward direction. The hinge system causes the aircraft door to translate such that the aircraft door remains parallel to the aircraft fuselage throughout an entirety of the second translation until the aircraft door reaches the open position.

20 Claims, 6 Drawing Sheets

(56) References Cited

U.S. PATENT DOCUMENTS

| | | | | |
|---|---|---|---|---|
| 5,289,615 A * | 3/1994 | Banks | ............... | B64C 1/143 |
| | | | | 244/905 |
| 2002/0096602 A1* | 7/2002 | Dazet | ............... | B64C 1/143 |
| | | | | 244/129.5 |
| 2008/0276428 A1* | 11/2008 | Clausen | ............ | E05D 3/127 |
| | | | | 16/354 |
| 2010/0024305 A1* | 2/2010 | Kim | .................. | E05D 3/12 |
| | | | | 244/129.5 |

* cited by examiner

DOUBLE TRANSLATING PLUG-TYPE PASSENGER ENTRY DOOR

FIELD

The present disclosure relates generally to an aircraft door system, and more particularly, to an initially inward opening pressurizable passenger entry aircraft door system with a double translating hinge motion.

BACKGROUND

Many aircrafts provide pressurizable doors that provide an entry and/or exit (or emergency egress) for passengers into and out of the aircraft. When such a pressurizable aircraft door is closed, latched, and locked, a plurality of door pressure stops must transfer pressure loads reacted by the aircraft door to adjacent aircraft fuselage structure around the aircraft door after the plane has initiated takeoff and the environmental cabin system (ECS) has initiated pressurization. However, the aircraft door must be able to move past these door pressure stops in order to open.

The most common way for an aircraft door to move past these door pressure stops is to lift the door high enough so as to provide adequate clearance between the door pressure stops and the corresponding fuselage pressure stops. To accomplish such a lift, which is traditionally mechanically actuated by the main door handle, such doors are equipped with robust counterbalance systems to counteract the weight of the door and emergency escape equipment that is mounted to the door. Such a counterbalance system adds weight and complexity to the aircraft door system. Therefore, an aircraft door system that enables the aircraft door to move past the fuselage pressure stops without lifting the door may be desirable.

SUMMARY

In one aspect, an aircraft door system is described. The aircraft door system includes (a) an aircraft door configured to translate from a closed position to an open position, wherein the aircraft door is configured to be coupled to an aircraft fuselage, (b) a plurality of door pressure stops positioned along a length of the aircraft door, wherein the plurality of door pressure stops contact a corresponding plurality of fuselage pressure stops when the aircraft door is in the closed position, (c) a handle coupled to the aircraft door, wherein a rotation of the handle causes a first translation of the aircraft door in an inward direction and a forward direction such that the plurality of door pressure stops no longer contact the corresponding plurality of fuselage pressure stops, and (d) a hinge system coupled to the aircraft door, wherein an outward force applied to the aircraft door causes a second translation of the aircraft door in an outward direction and a forward direction, and wherein the hinge system causes the aircraft door to translate such that the aircraft door remains parallel to the aircraft fuselage throughout an entirety of the second translation until the aircraft door reaches the open position.

In another aspect, an aircraft is described. The aircraft includes (a) a fuselage including a fuselage cutout, (b) an aircraft door coupled to the fuselage, wherein the aircraft door is configured to translate from a closed position in which the aircraft door covers the fuselage cutout to an open position in which at least a portion of the aircraft door is forward of the fuselage cutout, (c) a plurality of door pressure stops positioned along a length of the aircraft door, (d) a plurality of fuselage pressure stops configured to contact the plurality of door pressure stops when the aircraft door is in the closed position, (e) a handle coupled to the aircraft door, wherein a rotation of the handle causes a first translation of the aircraft door in an inward direction and a forward direction such that the plurality of door pressure stops no longer contact the plurality of fuselage pressure stops, (f) a hinge system coupled to the aircraft door, wherein an outward force applied to the aircraft door causes a second translation of the aircraft door in an outward direction and a forward direction, and wherein the hinge system causes the aircraft door to translate such that the aircraft door remains parallel to the fuselage throughout an entirety of the second translation until the aircraft door reaches the open position.

In yet another aspect, a method for establishing an aircraft door system of an aircraft described. The method includes (a) coupling an aircraft door to a fuselage of the aircraft, wherein the fuselage includes a fuselage cutout, and wherein the aircraft door is configured to translate from a closed position in which the aircraft door covers the fuselage cutout to an open position in which at least a portion of the aircraft door is forward of the fuselage cutout, (b) positioning a plurality of door pressure stops positioned along a length of the aircraft door, (c) positioning a plurality of fuselage pressure stops to contact the plurality of door pressure stops when the aircraft door is in the closed position, (d) coupling a handle to the aircraft door, wherein a rotation of the handle causes a first translation of the aircraft door in an inward direction and a forward direction such that the plurality of door pressure stops no longer contact the plurality of fuselage pressure stops, and (e) coupling a hinge system to the aircraft door, wherein an outward force applied to the aircraft door causes a second translation of the aircraft door in an outward direction and a forward direction, and wherein the hinge system causes the aircraft door to translate such that the aircraft door remains parallel to the fuselage throughout an entirety of the second translation until the aircraft door reaches the open position.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 6:
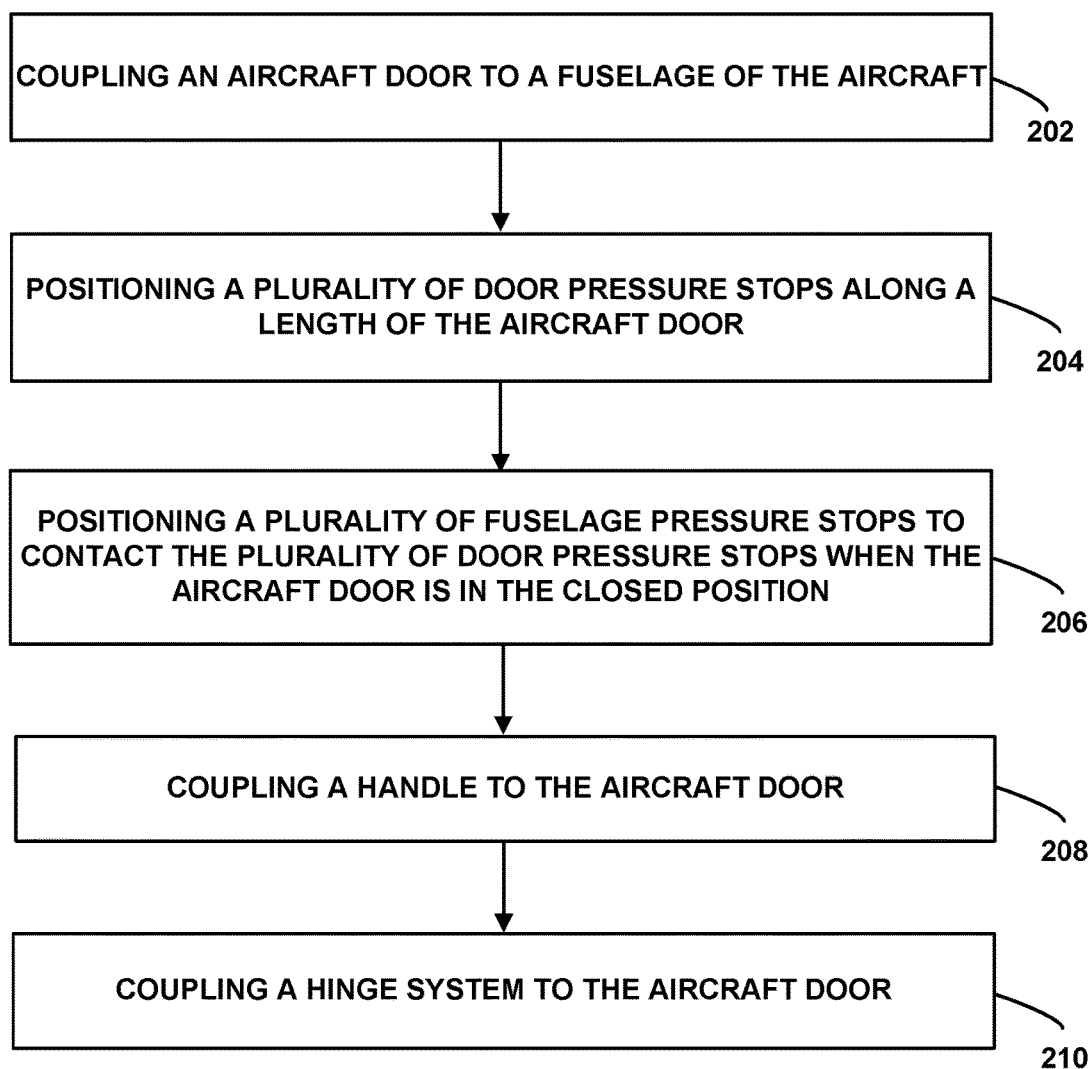
FIG. 6 is a flowchart of an example method, according to an example embodiment.

In FIG. 6, the blocks represent operations and/or portions thereof and lines connecting the various blocks do not imply any particular order or dependency of the operations or portions thereof. It will be understood that not all dependencies among the various disclosed operations are necessarily represented. FIG. 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise specifically noted, elements depicted in the drawings are not necessarily drawn to scale.

Illustrative, non-exhaustive examples, which may or may not be claimed, of the subject matter according the present disclosure are provided below.

Figure 1:
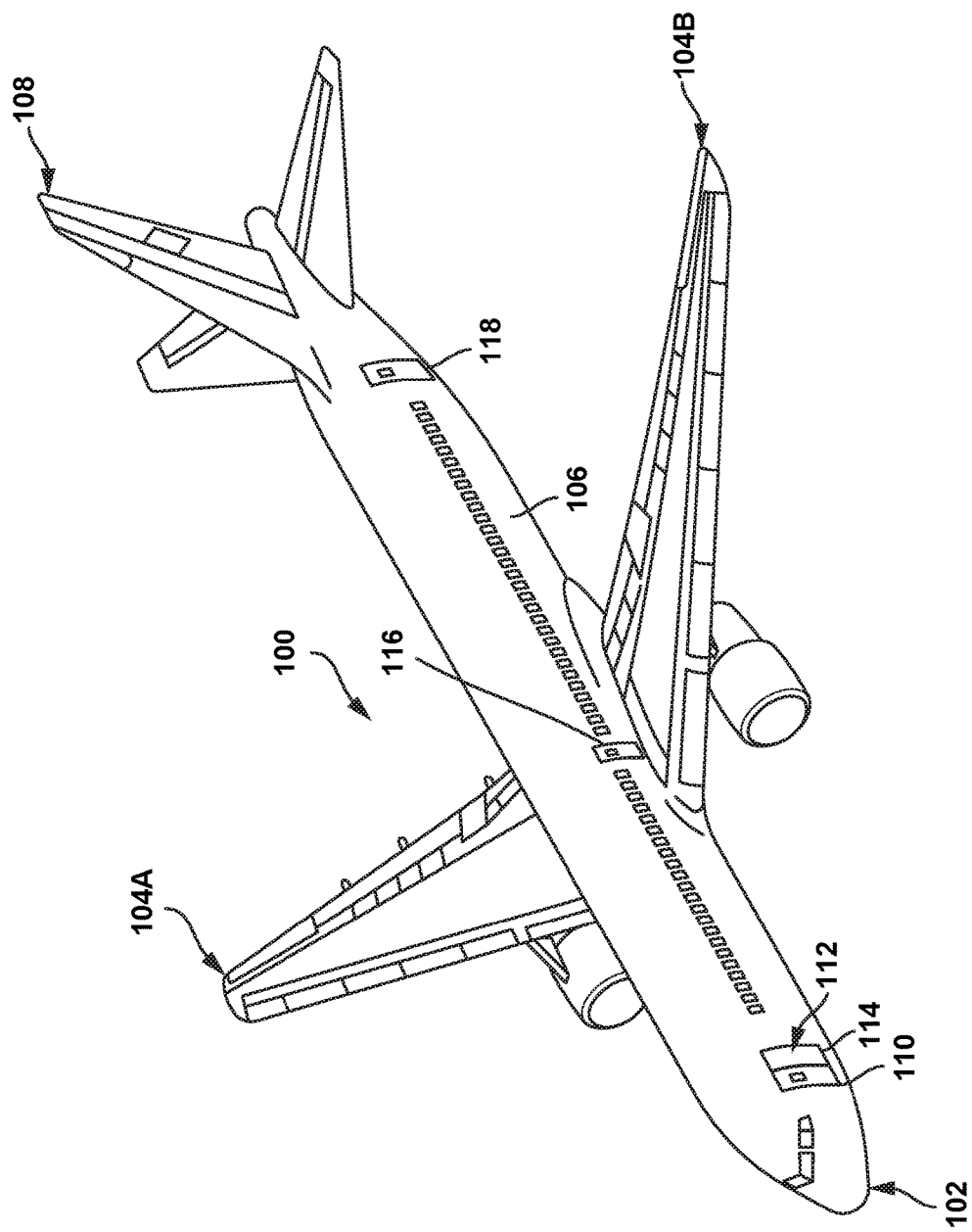
FIG. 1 is a perspective view of an aircraft, according to an example embodiment.

With reference to the Figures, FIG. 1 is a perspective view of an aircraft 100, according to an example implementation. The aircraft 100 includes a nose 102, wings 104A-104B, a fuselage 106, and a tail 108, according to an example implementation. The aircraft 100 includes many areas arranged for storage of items during flight. In one example, the fuselage 106 includes storage underneath a passenger compartment for storing luggage and other items or supplies. In another example, the passenger compartment in the fuselage 106 includes overhead bins and under seat areas for storing further items. As further illustrated in FIG. 1, the aircraft 100 includes an aircraft door 110 that provides entry and/or exit to and from the cabin 112 of the aircraft 100. As shown in FIG. 1, the fuselage 106 includes a fuselage cutout 114, and the aircraft door 110 is configured to translate from a closed position in which the aircraft door 110 covers the fuselage cutout 114 in the fuselage 106 to an open position (shown in FIG. 1) in which at least a portion of the aircraft door 110 is forward of the fuselage cutout 114 to thereby enable entry and/or exit to and from the cabin 112 of the aircraft 100. In one particular example, an entirety of the aircraft door 110 is forward of the fuselage cutout 114 when the aircraft door 110 is in the open position. As shown in FIG. 1, the aircraft 100 may further include a second aircraft door 116 and a third aircraft door 118 that may be similarly configured as the aircraft door 110. Additional numbers of aircraft doors are possible as well.

Figure 2:
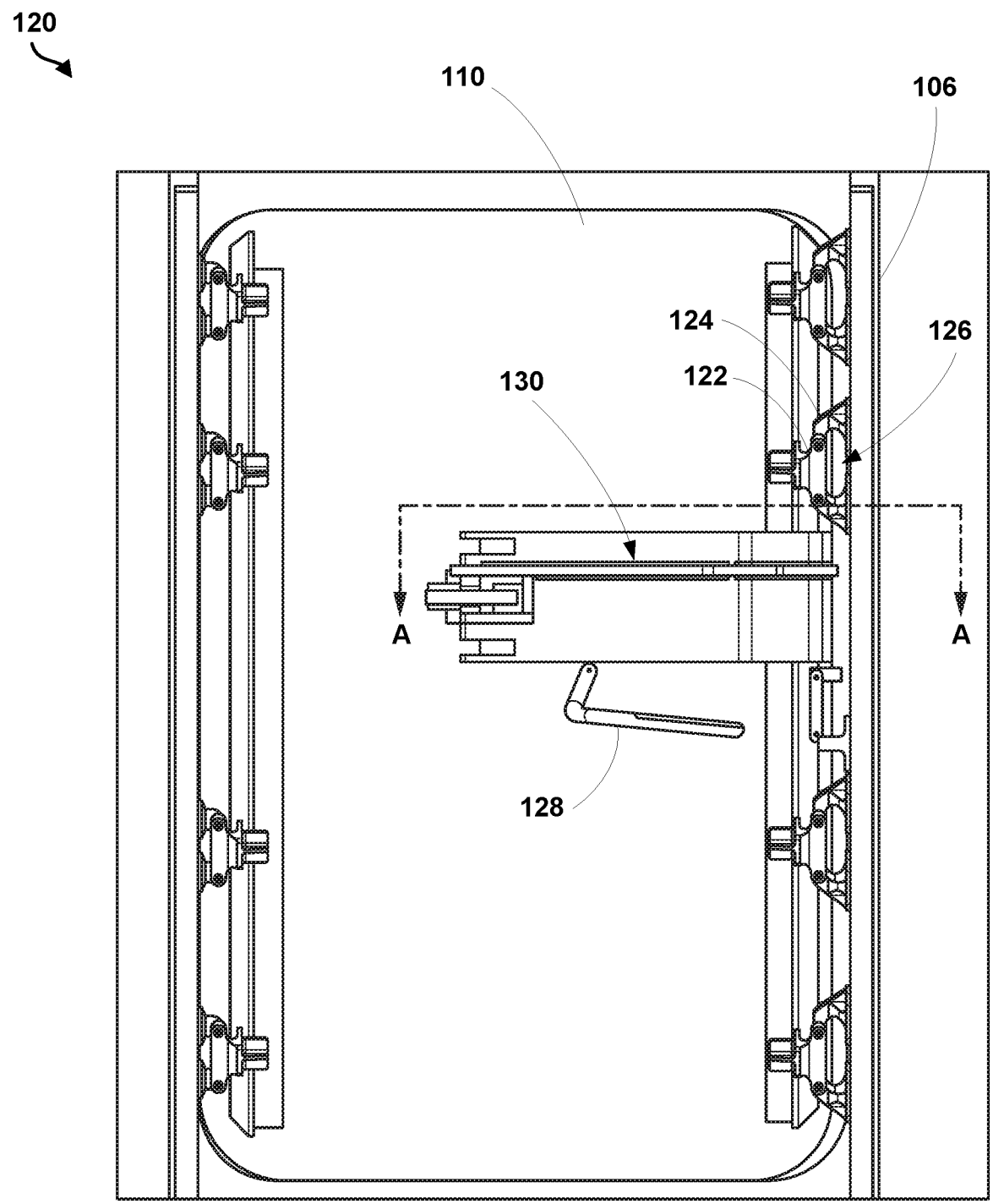
FIG. 2 a side view (looking outboard) of an aircraft door system, according to an example embodiment.

FIG. 2 illustrates an aircraft door system 120, according to an example embodiment. The aircraft door system 120 described herein may be utilized in the aircraft 100 described above in relation to FIG. 1. As shown in FIG. 2, aircraft door system 120 includes the aircraft door 110 that is configured to translate from a closed position to an open position. The aircraft door 110 is configured to be coupled to the fuselage 106.

Figure 3A:
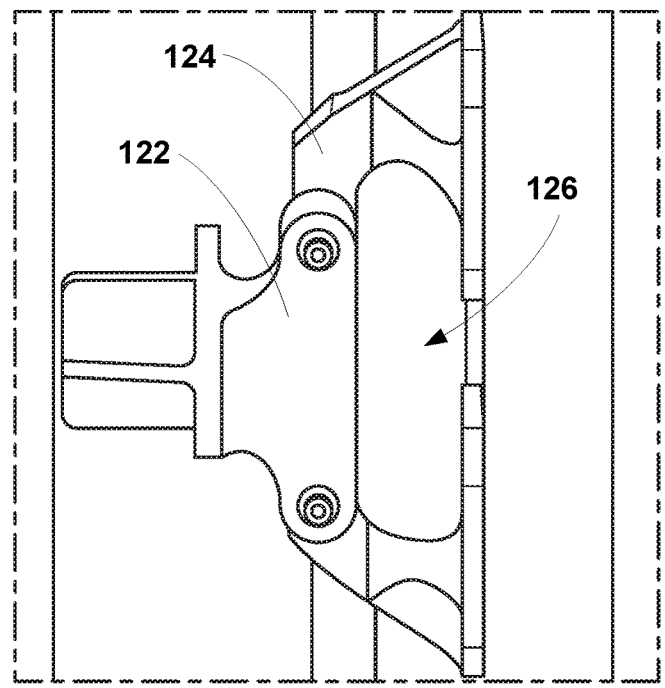
FIG. 3A illustrates a detailed view of a door pressure stop and corresponding fuselage pressure stop of the aircraft door system of FIG. 2 when the aircraft door is in a closed position, according to an example embodiment.

In one particular example, the aircraft door 110 may be a pressurizable passenger door, such as a plug-type aircraft door. As such, and as shown in FIG. 2, the aircraft door system 120 further includes a plurality of door pressure stops 122 positioned along a length of the aircraft door 110. The plurality of door pressure stops 122 contact a corresponding plurality of fuselage pressure stops 124 when the aircraft door 110 is in the closed position. When the aircraft door 110 is fully closed, the plurality of door pressure stops 122 transfer pressure loads reacted by the aircraft door 110 to the corresponding plurality of fuselage pressure stops 124. FIG. 3A illustrates a detailed view of a door pressure stop 122 and corresponding fuselage pressure stop 124 of the aircraft door system 120 of FIG. 2 when the aircraft door 110 is in a closed position, according to an example embodiment. As shown in FIG. 3A, the fuselage pressure stop 124 includes an opening 126 sized to allow the door pressure stop 122 to move past the fuselage pressure stop 124 in order for the aircraft door 110 to transition to the open position, as discussed in additional detail below.

Figure 3B:
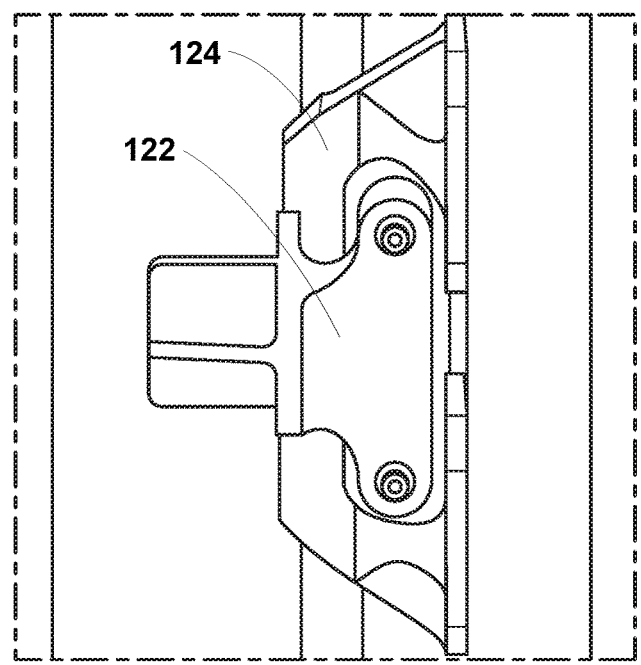
FIG. 3B illustrates a detailed view of a door pressure stop and corresponding fuselage pressure stop of the aircraft door system of FIG. 2 when the aircraft door is translating to an open position, according to an example embodiment.

As shown in FIG. 2, the aircraft door system 120 further includes a handle 128 coupled to the aircraft door 110. A rotation of the handle 128 causes a first translation of the aircraft door 110 in an inward direction (e.g., in a direction towards the cabin 112 of the aircraft 100) and a forward direction (e.g., in a direction towards the nose 102 of the aircraft 100) such that the plurality of door pressure stops 122 no longer contact the corresponding plurality of fuselage pressure stops 124. FIG. 3B illustrates a detailed view of a door pressure stop 122 and corresponding fuselage pressure stop 124 of the aircraft door system 120 of FIG. 2 when the aircraft door 110 is in the process of translating to an open position in response to the rotation of the handle 128, according to an example embodiment. In particular, as shown in FIG. 3B, when the handle 128 is rotated, the door pressure stop 122 moves so that it is aligned with the opening 126 in the fuselage pressure stop 124, so that a subsequent movement of the aircraft door 110 in an outward direction (e.g., in a direction away from the cabin 112 of the aircraft 100) enables the door pressure stop 122 to move past the fuselage pressure stop 124 in order for the aircraft door 110 to fully transition to the open position.

As shown in FIG. 2, the aircraft door system 120 further includes a hinge system 130 coupled to the aircraft door 110. After the first translation occurs and the door pressure stops 122 are clear of the fuselage pressure stops 124, an outward force (e.g., in a direction away from the cabin 112 of the aircraft 100) applied to the aircraft door 110 causes a second translation of the aircraft door 110 in an outward direction (e.g., in a direction away from the cabin 112 of the aircraft 100) and a forward direction (in a direction towards the nose 102 of the aircraft 100). In use, the hinge system 130 causes the aircraft door 110 to translate such that the aircraft door 110 remains parallel to the fuselage 106 throughout an entirety of the second translation until the aircraft door 110 reaches the open position. The hinge system 130 may be positioned entirely within an interior of the aircraft door 110, and the handle 128 extends to an exterior of the aircraft door 110 to receive input from a user.

A height of the aircraft door 110 relative to the fuselage 106 does not change when translating the aircraft door 110 from the closed position to the open position. As such, the double translation of the aircraft door 110 described above enables the plurality of door pressure stops 122 of the aircraft door 110 to move past the corresponding plurality of fuselage pressure stops 124 without the need for a heavy counterbalance system as the height of the aircraft door 110 remains constant throughout its motion.

Figure 4:
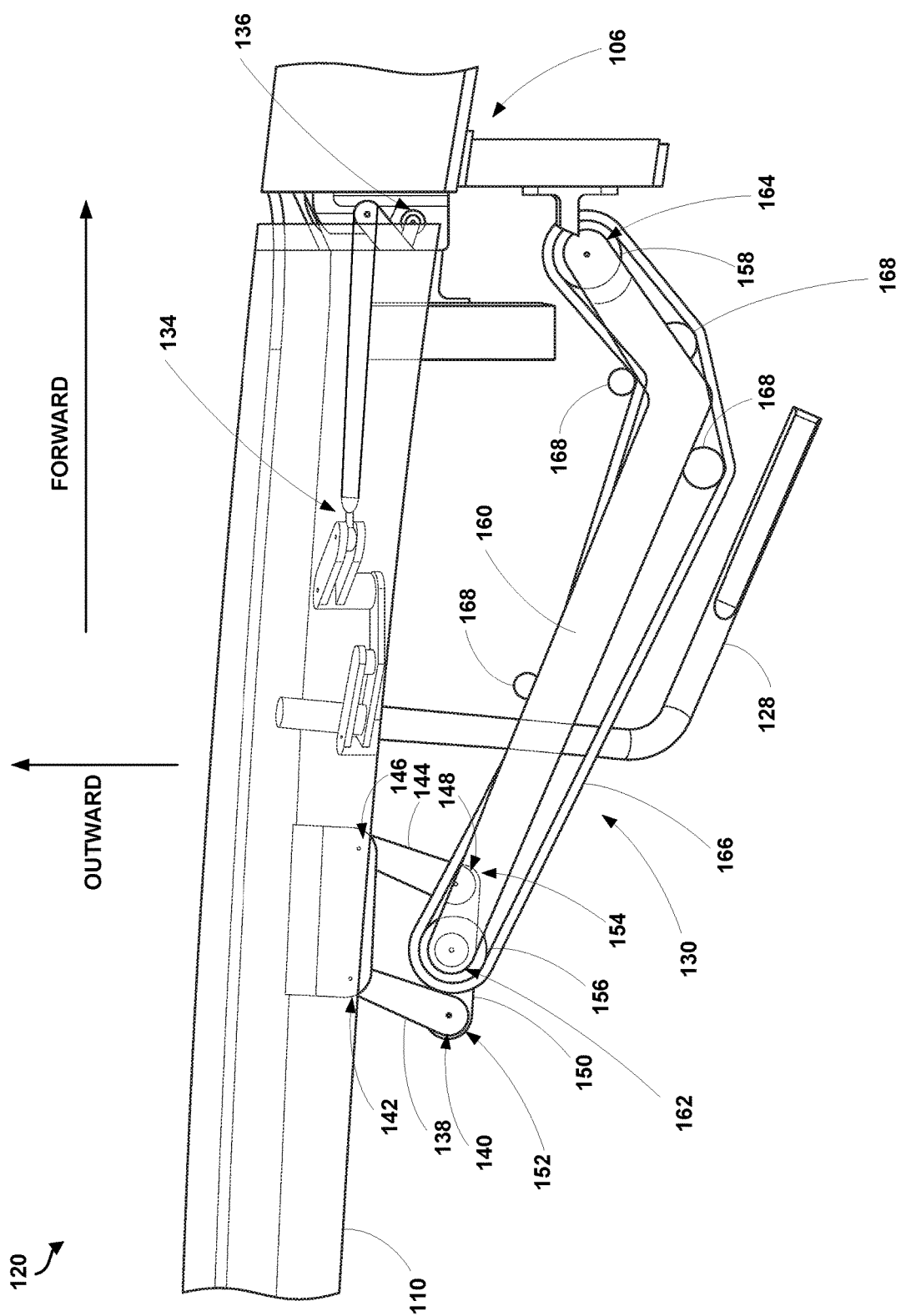
FIG. 4 is a detailed top cross-sectional view along A-A of the aircraft door system of FIG. 2, according to an example embodiment.

FIG. 4 is a detailed top cross-sectional view along A-A of the aircraft door system 120 of FIG. 2, according to an example embodiment. As shown in FIG. 4, the handle 128 is coupled to a linkage system 134, which is in coupled to a roller crank 136. When the handle 128 is rotated, the rotation of the handle 128 is translated to the linkage system 134, which in turn causes the roller crank 136 initiate the first translation of the aircraft door 110 in an inward direction (e.g., in a direction towards the cabin 112 of the aircraft 100) and a forward direction (e.g., in a direction towards the nose 102 of the aircraft 100) such that the plurality of door pressure stops 122 no longer contact the corresponding plurality of fuselage pressure stops 124.

As further shown in FIG. 4, the hinge system 130 may include an aft idler 138 having a first end 140 and a second end 142, and the second end 142 of the aft idler 138 is coupled to the aircraft door 110. The hinge system 130 may further include a forward idler 144 having a first end 148 and a second end 146, and the second end 146 of the forward idler 144 is coupled to the aircraft door 110. The hinge system 130 may further include a programming yoke 150 having a first end 152 and a second end 154. The first end 152 of the programming yoke 150 is coupled to the first end 140 of the aft idler 138, and the second end 154 of the programming yoke 150 is coupled to the first end 148 of the forward idler 144. The hinge system 130 may further include a first pulley 156 coupled to the programming yoke 150 between the first end 152 of the programming yoke 150 and the second end 154 of the programming yoke 150. The hinge system 130 may further include a second pulley 158 configured to be coupled to the fuselage 106. The hinge system 130 may further include a gooseneck hinge 160 having a first end 162 and a second end 164. The first end 162 of the gooseneck hinge 160 is coupled to the first pulley 156, and the second end 164 of the gooseneck hinge 160 is coupled to the second pulley 158. In addition, the second end 164 of the gooseneck hinge 160 is coupled to the fuselage 106. The hinge system 130 may further include a drive element 166 positioned around the first pulley 156 and the second pulley 158. The drive element 166 may comprise one of a belt, a chain, or a chord. Each of the aft idler 138, forward idler 144, programming yoke 150, first pulley 156, second pulley 158, gooseneck hinge 160, and drive element 166 may be positioned within an interior of the aircraft door 110, such that only a portion of handle 128 extends to an exterior of the aircraft door 110 to receive the rotational input from a user.

In one example, the gooseneck hinge 160 is configured to rotate approximately 140 degrees as the aircraft door 110 translates from the closed position to the open position. In another example, the gooseneck hinge 160 further includes a plurality of pulleys 168 configured to contact the drive element 166 between the first end 162 of the gooseneck hinge 160 and the second end 164 of the gooseneck hinge 160. The plurality of pulleys 168 in combination with the first pulley 156 and the second pulley 158 enable the drive element 166 to move freely around the gooseneck hinge 160 to enable the programming yoke 150 to rotate at a 1:1 rate with respect to the fuselage 106 thus programming the aircraft door 110 to translate to the open position while remaining parallel to the fuselage 106. In particular, the second pulley 158 is grounded to the fuselage 106 which imparts the 1:1 spin into the programming yoke 150. The aircraft door 110 moves parallel to the programming yoke 150, which is spinning about the first end 162 of the gooseneck hinge 160.

In use, after the handle 128 is rotated to disengage the plurality of door pressure stops 122 from the corresponding plurality of fuselage pressure stops 124, a user can apply an outward force to the aircraft door 110 via the handle 128. As the aircraft door 110 moves outward, the aircraft door 110 rotates around its couple with the fuselage 106. As mentioned above, the gooseneck hinge 160 is separately connected to the fuselage 106, for example via single pin joints. The second pulley 158 is connected to the gooseneck hinge 160 and grounded to the fuselage 106. The four-bar linkage formed by the aircraft door 110, the aft idler 138, the forward idler 144, and the programming yoke 150 in combination with the first pulley 156, the second pulley 158, and the drive element 166 causes the programming yoke 150 to rotate at a 1:1 rate relative to the fuselage 106 to maintain the aircraft door 110 parallel to the fuselage 106 throughout the opening process.

As such, the 1:1 relationship is between the programming yoke 150 and the fuselage 106, which grounds the second pulley 158. The programming yoke 150 spins relative to the gooseneck hinge 160. The drive element 166 takes any angular change made at the gooseneck hinge 160 and fuselage 106 coupling and transmits it to the programming yoke 150. Therefore, as the aircraft door 110 opens, the programming yoke 150 moves parallel to the fuselage 106. The aircraft door 110 remains parallel as well by way of the four-bar linkage that connects the aircraft door 110 to the programming yoke 150.

Figure 5A:
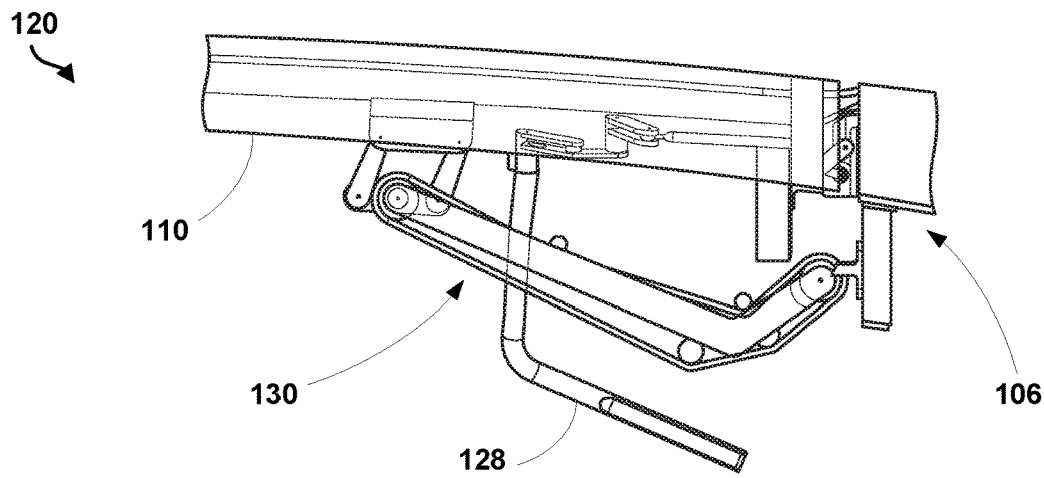
FIG. 5A illustrates the aircraft door system of FIG. 2 with the aircraft door in a closed positioned, according to an example embodiment.
Figure 5B:
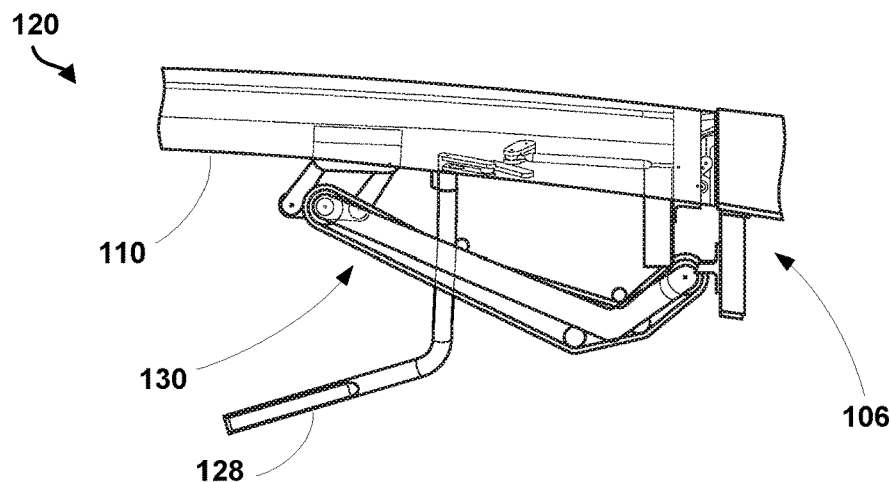
FIG. 5B illustrates the aircraft door system of FIG. 2 with the aircraft door unlatched but not yet open, according to an example embodiment.
Figure 5C:
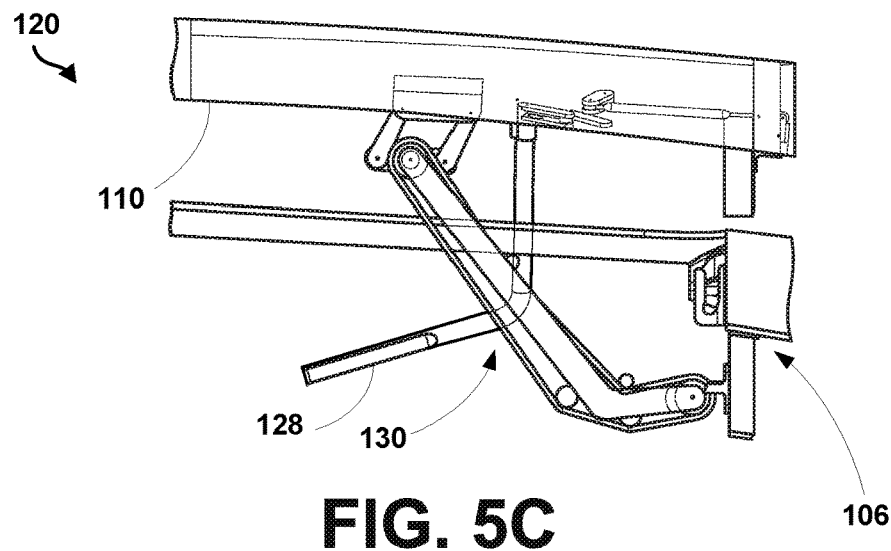
FIG. 5C illustrates the aircraft door system of FIG. 2 with the aircraft door transitioning to an open position, according to an example embodiment.

FIGS. 5A-5C illustrate the aircraft door system 120 of FIG. 2 in various stages of transition from the closed position to the open position. In particular, FIG. 5A illustrates the aircraft door system 120 of FIG. 2 with the aircraft door in the closed positioned.

FIG. 5B illustrates the aircraft door system 120 of FIG. 2 with the aircraft door unlatched but not yet open. Such an arrangement occurs when the user rotates the handle 128 of the aircraft door 110. As discussed above, the rotation of the handle 128 initiates the first translation of the aircraft door 110 in an inward direction (e.g., in a direction towards the cabin 112 of the aircraft 100) and a forward direction (e.g., in a direction towards the nose 102 of the aircraft 100) such that the plurality of door pressure stops 122 no longer contact the corresponding plurality of fuselage pressure stops 124.

FIG. 5C illustrates the aircraft door system 120 of FIG. 2 transitioning to an open position. Such an arrangement occurs when the user applies an outward force (e.g., in a direction away from the cabin 112 of the aircraft 100) to the aircraft door 110. As discussed above, the application of an outward force on the aircraft door 110 after the handle 128 has been rotated initiates the second translation of the aircraft door 110 in an outward direction (e.g., in a direction away from the cabin 112 of the aircraft 100) and a forward direction (in a direction towards the nose 102 of the aircraft 100). The hinge system 130 of the aircraft door system 120 causes the aircraft door 110 to translate such that the aircraft door 110 remains parallel to the fuselage 106 throughout an entirety of the second translation until the aircraft door 110 reaches the open position.

FIG. 6 is a block diagram of an example of a method for establishing an aircraft door system 120 of an aircraft 100. Method 200 shown in FIG. 6 presents an embodiment of a method that could be used with any of the embodiments of the aircraft 100 and the aircraft door system 120 discussed above in relation to FIGS. 1-5C, as examples. Method 200 includes one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes coupling an aircraft door 110 to a fuselage 106 of the aircraft 100. The fuselage 106 includes a fuselage cutout 114, and the aircraft door 110 configured to translate from a closed position in which the aircraft door 110 covers the fuselage cutout 114 to an open position in which at least a portion of the aircraft door 110 is forward of the fuselage cutout 114.

At block 204, the method 200 includes positioning a plurality of door pressure stops 122 along a length of the aircraft door 110. At block 206, the method 200 includes positioning a plurality of fuselage pressure stops 124 to contact the plurality of door pressure stops 122 when the aircraft door is in the closed position. As discussed above, the interaction of the plurality of door pressure stops 122 and the plurality of fuselage pressure stops 124 transfer pressure loads from the aircraft door 110 to the fuselage 106 when the aircraft 100 is pressurized.

At block 208, the method 200 includes coupling a handle 128 to the aircraft door 110. As discussed above, a rotation of the handle 128 causes a first translation of the aircraft door 110 in an inward direction and a forward direction such that the plurality of door pressure stops 122 no longer contact the plurality of fuselage pressure stops 124.

At block 210, the method 200 includes coupling a hinge system 130 to the aircraft door 110. As discussed above, an outward force applied to the aircraft door 110 causes a second translation of the aircraft door 110 in an outward direction and a forward direction. Further, the hinge system 130 causes the aircraft door 110 to translate such that the aircraft door 110 remains parallel to the fuselage 106 throughout an entirety of the second translation until the aircraft door 110 reaches the open position.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An aircraft door system comprising:
   an aircraft door configured to translate from a closed position to an open position, wherein the aircraft door is configured to be coupled to an aircraft fuselage;
   a plurality of door pressure stops positioned along a length of the aircraft door, wherein the plurality of door pressure stops contact a corresponding plurality of fuselage pressure stops when the aircraft door is in the closed position;
   a handle coupled to the aircraft door, wherein a rotation of the handle causes a first translation of the aircraft door in an inward direction and a forward direction such that the plurality of door pressure stops no longer contact the corresponding plurality of fuselage pressure stops; and a hinge system coupled to the aircraft door, wherein an outward force applied to the aircraft door causes a second translation of the aircraft door in an outward direction and the forward direction, and wherein the hinge system causes the aircraft door to translate such that the aircraft door remains parallel to the aircraft fuselage throughout an entirety of the second translation until the aircraft door reaches the open position, wherein the hinge system comprises:

an aft idler having a first end and a second end, wherein the second end of the aft idler is coupled to the aircraft door;

a forward idler having a first end and a second end, wherein the second end of the forward idler is coupled to the aircraft door;

a programming yoke having a first end and a second end, wherein the first end of the programming yoke is coupled to the first end of the aft idler, and wherein the second end of the programming yoke is coupled to the first end of the forward idler; and wherein each of the aft idler, the forward idler, and the programming yoke are positioned within an interior of the aircraft door, and wherein the handle extends to an exterior of the aircraft door.

2. The aircraft door system of claim 1, wherein the hinge system comprises:

a first pulley coupled to the programming yoke between the first end of the programming yoke and the second end of the programming yoke;

a gooseneck hinge having a first end and a second end, wherein the first end of the gooseneck hinge is coupled to the first pulley;

a second pulley configured to be coupled to the aircraft fuselage, wherein the second end of the gooseneck hinge is coupled to the second pulley; and a drive element positioned around the first pulley and the second pulley.

3. The aircraft door system of claim 2, wherein the drive element comprises one of a belt, a chain, or a chord.

4. The aircraft door system of claim 2, wherein the gooseneck hinge is configured to rotate 140 degrees as the aircraft door translates from the closed position to the open position.

5. The aircraft door system of claim 2, wherein the gooseneck hinge further includes a plurality of pulleys configured to contact the drive element between the first end of the gooseneck hinge and the second end of the gooseneck hinge.

6. The aircraft door system of claim 2, wherein each of the first pulley, second pulley, gooseneck hinge, and drive element are positioned within an interior of the aircraft door.

7. The aircraft door system of claim 1, wherein a height of the aircraft door relative to the aircraft fuselage does not change when translating the aircraft door from the closed position to the open position.

8. The aircraft door system of claim 1, wherein the aircraft door covers a fuselage cutout in the aircraft fuselage in the closed position, and wherein at least a portion of the aircraft door is forward of the fuselage cutout in the open position.

9. An aircraft comprising:

a fuselage including a fuselage cutout;

an aircraft door coupled to the fuselage, wherein the aircraft door is configured to translate from a closed position in which the aircraft door covers the fuselage cutout to an open position in which at least a portion of the aircraft door is forward of the fuselage cutout;

a plurality of door pressure stops positioned along a length of the aircraft door;

a plurality of fuselage pressure stops configured to contact the plurality of door pressure stops when the aircraft door is in the closed position;

a handle coupled to the aircraft door, wherein a rotation of the handle causes a first translation of the aircraft door in an inward direction and a forward direction such that the plurality of door pressure stops no longer contact the plurality of fuselage pressure stops; and a hinge system coupled to the aircraft door, wherein an outward force applied to the aircraft door causes a second translation of the aircraft door in an outward direction and the forward direction, and wherein the hinge system causes the aircraft door to translate such that the aircraft door remains parallel to the fuselage throughout an entirety of the second translation until the aircraft door reaches the open position, wherein the hinge system comprises:

an aft idler having a first end and a second end, wherein the second end of the aft idler is coupled to the aircraft door;

a forward idler having a first end and a second end, wherein the second end of the forward idler is coupled to the aircraft door;

a programming yoke having a first end and a second end, wherein the first end of the programming yoke is coupled to the first end of the aft idler, and wherein the second end of the programming yoke is coupled to the first end of the forward idler; and wherein each of the aft idler, the forward idler, and the programming yoke are positioned within an interior of the aircraft door, and wherein the handle extends to an exterior of the aircraft door.

10. The aircraft of claim 9, wherein the hinge system comprises:

a first pulley coupled to the programming yoke between the first end of the programming yoke and the second end of the programming yoke;

a gooseneck hinge having a first end and a second end, wherein the first end of the gooseneck hinge is coupled to the first pulley;

a second pulley configured to be coupled to the fuselage, wherein the second end of the gooseneck hinge is coupled to the second pulley; and a drive element positioned around the first pulley and the second pulley.

11. The aircraft of claim 10, wherein the gooseneck hinge is configured to rotate 140 degrees as the aircraft door translates from the closed position to the open position.

12. The aircraft of claim 10, wherein the gooseneck hinge further includes a plurality of pulleys configured to contact the drive element between the first end of the gooseneck hinge and the second end of the gooseneck hinge.

13. The aircraft of claim 9, wherein a height of the aircraft door relative to the fuselage does not change when translating the aircraft door from the closed position to the open position.

14. The aircraft of claim 9, wherein at least a portion of the aircraft door is forward of the fuselage cutout when the aircraft door is in the open position.

15. A method for establishing an aircraft door system of an aircraft, the method comprising:

coupling an aircraft door to a fuselage of the aircraft, wherein the fuselage includes a fuselage cutout, and wherein the aircraft door is configured to translate from a closed position in which the aircraft door covers the fuselage cutout to an open position in which at least a portion of the aircraft door is forward of the fuselage cutout;

positioning a plurality of door pressure stops along a length of the aircraft door;

positioning a plurality of fuselage pressure stops to contact the plurality of door pressure stops when the aircraft door is in the closed position;

coupling a handle to the aircraft door, wherein a rotation of the handle causes a first translation of the aircraft door in an inward direction and a forward direction such that the plurality of door pressure stops no longer contact the plurality of fuselage pressure stops; and coupling a hinge system to the aircraft door, wherein an outward force applied to the aircraft door causes a second translation of the aircraft door in an outward direction and the forward direction, and wherein the hinge system causes the aircraft door to translate such that the aircraft door remains parallel to the fuselage throughout an entirety of the second translation until the aircraft door reaches the open position, wherein the hinge system comprises:

an aft idler having a first end and a second end, wherein the second end of the aft idler is coupled to the aircraft door;

a forward idler having a first end and a second end, wherein the second end of the forward idler is coupled to the aircraft door;

a programming yoke having a first end and a second end, wherein the first end of the programming yoke is coupled to the first end of the aft idler, and wherein the second end of the programming yoke is coupled to the first end of the forward idler; and wherein each of the aft idler, the forward idler, and the programming yoke are positioned within an interior of the aircraft door, and wherein the handle extends to an exterior of the aircraft door.

16. The method of claim 15, wherein the hinge system comprises:

a first pulley coupled to the programming yoke between the first end of the programming yoke and the second end of the programming yoke;

a gooseneck hinge having a first end and a second end, wherein the first end of the gooseneck hinge is coupled to the first pulley;

a second pulley configured to be coupled to the fuselage, wherein the second end of the gooseneck hinge is coupled to the second pulley; and a drive element positioned around the first pulley and the second pulley.

17. The method of claim 16, wherein the gooseneck hinge is configured to rotate 140 degrees as the aircraft door translates from the closed position to the open position.

18. The method of claim 16, wherein the gooseneck hinge further includes a plurality of pulleys configured to contact the drive element between the first end of the gooseneck hinge and the second end of the gooseneck hinge.

19. The method of claim 15, wherein a height of the aircraft door relative to the fuselage does not change when translating the aircraft door from the closed position to the open position.

20. The method of claim 15, wherein at least a portion of the aircraft door is forward of the fuselage cutout when the aircraft door is in the open position.

* * * * *